April 22, 1952     A. P. CHARBONNEAU     2,594,255
ANTICORROSION MOUNTING FOR ELECTRIC IMMERSION HEATERS
Filed Aug. 14, 1950
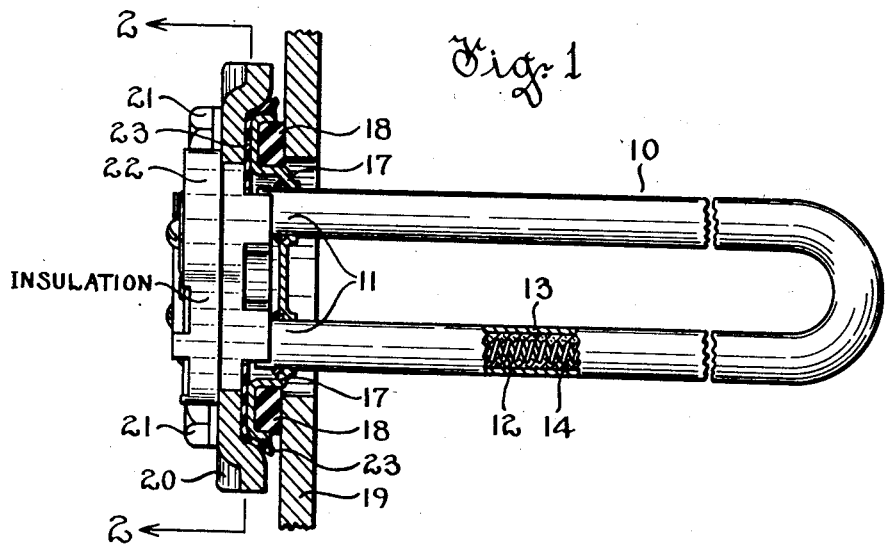
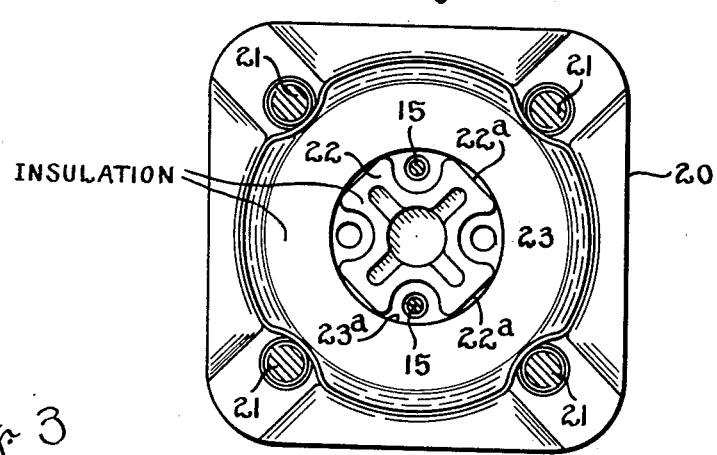
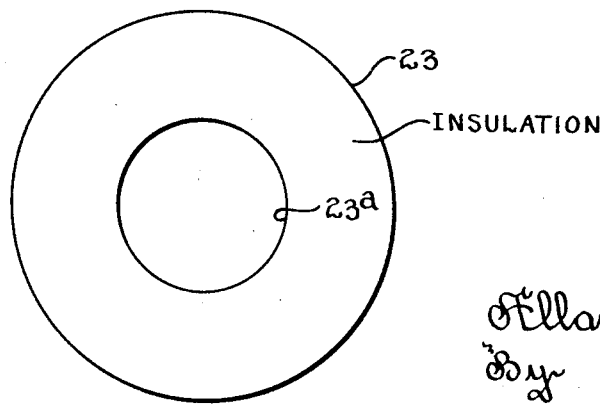
Inventor
Allan P. Charbonneau
By W. E. Lyon
Attorney Patented Apr. 22, 1952

2,594,255

UNITED STATES PATENT OFFICE 2,594,255

ANTICORROSION MOUNTING FOR ELECTRIC IMMERSION HEATERS

Allan P. Charbonneau, Wauwatosa, Wis., assignor to Cutler-Hammer, Inc., Milwaukee, Wis., a corporation of Delaware Application August 14, 1950, Serial No. 179,143

7 Claims. (Cl. 219—38)

This invention relates to electric immersion heaters and more particularly to an improved mounting means for heaters of this type whereby corrosion of the receptacle by galvanic action between it and its associated heater is eliminated.

Corrosion of water heater tanks due to galvanic action has long been recognized as a serious problem because it considerably reduces the life of the tanks. Although numerous methods have been employed to lengthen the life of such tanks, none of them heretofore has been entirely satisfactory.

The problem has been particularly acute in electric hot water heaters. In these heaters the tank member is usually steel and the electric heating elements are ordinarily sheathed with copper, a metal which is less active chemically than steel or iron. Because there is ordinarily a certain percentage of salts in water and because the heater is mounted on and is in electrical contact with the tank, the tank and the heater form two electrodes immersed in an electrolyte (the water) and a path is provided for current flow between them. Because of the more active nature of iron, the tank is attacked and ultimately fails. If the iron is coated with a more active metal, e. g. zinc, the coating will protect the iron but is itself eventually eaten away by the electrolytic action.

Accordingly, an object of my invention is to eliminate the corrosion in electric hot water heaters due to electrolytic action between the heater and the tank.

Another object of my invention is to provide novel means for interrupting the path provided for current flow between the tank and the heater.

Another object of my invention is to provide an improved electric immersion heater assembly in which the heater is electrically insulated from both the tank and the heater mounting plate.

Another object of my invention is to provide an improved electric immersion heater assembly in which the heater may be electrically insulated from the tank while at the same time permitting the mounting plate to be grounded to prevent its becoming live should the insulation in the heater fail.

Another object of my invention is to provide novel and economical means for modifying a conventional electric immersion water heater assembly to interrupt the electrical circuit between the heater and the tank on which it is mounted.

Other objects and advantages of my invention will hereinafter appear.

For the purposes of illustrating my invention I have shown it as applied to an electric immersion heater assembly of the type shown and described in my United States Patent No. 2,471,609, dated May 31, 1949, and assigned to the same assignee as that of the instant application. Reference may be had to that patent for a more detailed description of the particular assembly. However, it is to be understood that my invention is not limited to the particular structure therein disclosed and that it may be equally well applied to other types of electric immersion heaters.

In the accompanying drawing,

Figure 1 is a side elevational view of an electric immersion heater inclusive of mounting means, the heater being shown as projecting through a tank wall, the tank wall and certain parts of the heater mounting means being shown in section.

Fig. 2 is a plan view of the heater mounting means taken along the lines 2—2 of Fig. 1, with certain parts of the mounting means being shown in section.

Fig. 3 is a plan view of the insulating disc shown in position in Figs. 1 and 2.

The heater 10 shown in Fig. 1 is of the so-called tubular type, and preferably comprises a helical resistor 12 surrounded by a seamless and bendable tubular metal sheath 13 from which it is spaced and insulated by granular insulating material 14. The sheath 13, which is usually formed of a corrosion-resistant metal, such as copper, has its ends 11 projecting a short distance through a gasket plate 17 which is preferably formed of brass. A watertight seal is effected between the sheath 13 and the plate 17 by means of welding or brazing. A washer-shaped gasket 18, formed of a heat resisting electrically insulating material such as impregnated asbestos, is carried by gasket plate 17 and is pressed into engagement with the tank or receptacle wall 19 by means of a mounting plate 20 which is bolted to the wall 19 by means of bolts 21, the gasket being so positioned that neither the sheath 13 nor the gasket plate 17 comes into electrical contact with the tank wall 19.

The mounting plate 20 is centrally apertured to receive a shouldered insulating block 22 which is recessed to receive the ends 11 of the tubular sheath 13. The insulating block 22 is also provided with openings for projection therethrough of heater terminals 15 which are connected to terminal plates on the outer side of block 22. It thus will be seen that the heater 10 is effectively insulated from the mounting plate 20 with the exception of contact between the gasket plate 17 and the mounting plate 20 when the heater is mounted in position on the receptacle wall 19.

However, to prevent electrical contact between the gasket plate 17 and the mounting plate 20, I provide a flat centrally apertured disc 23 (Fig. 3) which is made from varnish impregnated cambric cloth or other flexible insulating material. The central opening 23a of the insulating disc 23 is of just sufficient diameter to permit the shoulders 22a on the inner side of the block 22 to project therethrough. The outer diameter of the disc 23 is preferably large enough to permit the disc to overlie the gasket plate 17, as best shown in Fig. 1. In this manner the outer edge of the disc 23 will also cover the inner sides of the bolts 21, as best shown in Fig. 2, and protect against their coming into contact with the gasket plate 17.

As will now be apparent, the disc 23 together with the insulating gasket 18, serves to electrically insulate the heater 10 from both the mounting plate 20 and the receptacle wall 19. In this manner the circuit which would otherwise permit a flow of galvanic current between the tank and the heater is interrupted.

I prefer to make the discs 23 round because of the simplicity of fabrication and the ease of positioning such shaped discs in the particular mounting assembly illustrated. It is, of course, apparent that the discs 23 may assume shapes other than that shown in Fig. 3, the only requirement being that it continue to assure effective electrical isolation of the heater from its mounting means.

It thus will be seen that in a simple, novel and inexpensive manner I have provided an improved mounting assembly for electric immersion heaters which effectively eliminates the corrosion occasioned by galvanic action. Further, it will be seen that I have provided a completely safe mounting assembly which permits grounding of the external mounting plate to the receptacle wall.

I claim:

1. In combination, a tank having an opening for insertion of an electric heater therethrough, a sheathed electric immersion heater having a closure member for overlying and sealing said opening, a gasket formed of electrically insulating material between said closure member and said tank, said gasket serving to electrically insulate said heater from said tank, a mounting plate for securing said heater in position on said tank, and an electrically insulating disc member positioned between said mounting plate and said closure member whereby said heater is electrically insulated from both said tank and said mounting plate.

2. In combination, a receptacle having an opening for insertion of an electric immersion heater therethrough, a sheathed electric immersion heater having a gasket plate for overlying and sealing said opening, an electrically insulating gasket for insulating said gasket plate from said receptacle, and mounting means including a mounting plate for urging said gasket plate into engagement with said gasket, said mounting means also including means for electrically insulating said mounting plate from said heater.

3. In combination, a receptacle having an opening for insertion of an electric immersion heater therethrough, a sheathed electric immersion heater, a supporting plate for holding said heater in position in said opening, and electric insulating means positioned between said heater and said plate whereby said heater is electrically insulated from said receptacle.

4. In combination, a sheathed electric immersion heater having a gasket plate, a gasket formed of electrically insulating material adjacent the inner face of said gasket plate, a mounting plate for said heater, and an electrically insulating disc member positioned between said mounting plate and said gasket plate whereby said heater is electrically insulated from said mounting plate.

5. In an electric immersion heater mounting assembly, in combination, a heater for insertion through an opening in a receptacle, said heater including a gasket plate for overlying said opening, an electrically insulating gasket for insertion between the inner surface of said gasket plate and the outer surface of said receptacle contiguous to said opening, a mounting plate for urging said gasket plate toward said receptacle wall, and means adjacent said mounting plate for electrically insulating said mounting plate from said heater.

6. In combination, a sheathed electric immersion heater having a gasket plate to close and seal the entrance opening for said heater in a receptacle, said plate having a central portion through which said heater projects and with which said heater has fluid tight connection, an electrically insulating gasket adjacent the inner face of said gasket plate, and a mounting plate electrically insulated from said heater for holding said gasket plate in sealing engagement with said receptacle.

7. The combination with an electric heater for immersion in a liquid containing tank, of means including a mounting plate for sealably attaching said heater to said tank, and means for preventing establishment of any galvanic circuits between said tank and said heater, said last-mentioned means comprising an insulating member interposed between said heater and said mounting plate to afford electrical isolation therebetween.

ALLAN P. CHARBONNEAU.

REFERENCES CITED

The following references are of record in the file of this patent:

UNITED STATES PATENTS

| Number | Name | Date |
| --- | --- | --- |
| 2,286,340 | Bulpitt | June 16, 1942 |
| 2,471,609 | Charbonneau | May 31, 1949 |